(12) United States Patent
Pearce

(10) Patent No.: US 8,427,952 B1
(45) Date of Patent: Apr. 23, 2013

(54) MICROCODE ENGINE FOR PACKET PROCESSING

(75) Inventor: Jonathan R. Pearce, Sherwood, OR (US)

(73) Assignee: Packet Plus, Inc., Portland, OR (US)

( * ) Notice: Subject to any disclaimer, the term of this patent is extended or adjusted under 35 U.S.C. 154(b) by 478 days.

(21) Appl. No.: 12/730,676

(22) Filed: Mar. 24, 2010

Related U.S. Application Data

(60) Provisional application No. 61/162,918, filed on Mar. 24, 2009.

(51) Int. Cl.
  *G08C 15/00* (2006.01)
  *H04Q 11/00* (2006.01)
  *G06F 9/40* (2006.01)

(52) U.S. Cl.
  USPC .................. 370/235; 370/383; 712/205

(58) Field of Classification Search ............ 370/235, 370/382, 383; 712/205, E9.082
  See application file for complete search history.

(56) References Cited

U.S. PATENT DOCUMENTS

| | | | |
|---|---|---|---|
| 2003/0177252 A1* | 9/2003 | Krichevski et al. | 709/230 |
| 2003/0193949 A1* | 10/2003 | Kojima et al. | 370/392 |
| 2005/0281202 A1* | 12/2005 | Rocheleau et al. | 370/241 |
| 2008/0151935 A1* | 6/2008 | Sarkinen et al. | 370/469 |
| 2009/0213856 A1* | 8/2009 | Paatela et al. | 370/392 |

OTHER PUBLICATIONS

Jakob Carlstrom, "Synchronous Dataflow Architecture for Network Processors," Sep. 2004, IEEE Micro Processors, pp. 10-18.*

* cited by examiner

*Primary Examiner* — Dang Ton
*Assistant Examiner* — Ryan Kavleski
(74) *Attorney, Agent, or Firm* — Stoel Rives LLP

(57) ABSTRACT

Apparatus and methods to efficiently process packet data are disclosed. In one embodiment, a microcode engine designed to efficiently parse packet data may use instructions that are tailored to parse packet data fields of a data packet having nested protocols. The microcode engine design and the instruction set may enable highly efficient packet processing while preserving flexibility as to the packet protocols that can be processed. The implementation can be both specific to a packet processing task while allowing reprogramming to perform a different specific task simply by changing the instructions. The microcode engine may execute instructions in a single clock cycle or in a pipelined configuration to generate appropriately modified packet data. The microcode engine may operate in lock step with received packet data.

26 Claims, 7 Drawing Sheets

MICROCODE ENGINE FOR PACKET PROCESSING

CROSS-REFERENCE TO RELATED APPLICATION

This application claims the benefit under 35 U.S.C. §119 (e) of U.S. Provisional Patent Application No. 61/162,918, filed Mar. 24, 2009, which is hereby incorporated by reference herein in its entirety.

TECHNICAL FIELD

This disclosure relates generally to apparatus and methods for data packet processing.

BACKGROUND INFORMATION

The types and number of networking protocols available is proliferating at a rapid rate, and many existing protocols are being upgraded to faster, more complex, and/or more efficient versions. Example of packet protocols which may be nested may include, but are not limited to Transport Control Protocol (TCP), Internet Protocol (IP, IPv4, IPv6), User Datagram Protocol (UDP), Ethernet (802.3), Wi-Fi (IEEE 802.11), WiMAX (IEEE 802.16), and ZigBee (IEEE 802.15.4).

Networking applications are built as a succession of layers with each layer based on a different protocol. For example, FIG. 1 illustrates a data packet 100 having multiple levels of networking protocols. A typical data packet, such as data packet 100, may include a first level 110 having a base protocol that may include a header 112, a payload 114, and an error detection code 116 (e.g., a checksum). The header 112 may include a number of fields of varying sizes, which provide information about the data packet 100 including, for example, the size/length, the source address, and the destination address. The payload 114 of the first level 110 may also be a variable size. The payload 114 of the first level 110 may include a header 122 and payload 124 (and possibly an error detection code) of a second (nested) level protocol 120. Similarly, the payload 124 of the second level 120 may include a header 132 and a payload 134 (and possibly an error detection code) of a third (nested) level protocol 130.

This nesting of packet data in multiple levels of protocol (i.e., nesting of packets in payloads) may repeat for several layers. The nesting of protocols can make it difficult to locate and/or isolate a particular piece of data in a packet, because locating and isolating a particular piece of data in a packet is based on the base protocol and all prior nested protocols. The difficulty is compounded when locating/isolating a particular piece of data in substantially real-time is desirable. The difficulty can affect performance of applications using particular packet data. As an example, computer networking involves analyzing packet headers to verify protocol correctness, extraction of protocol header fields, and making decisions based on the protocol header fields. Routing decisions—e.g., how to route a packet—are based on, for example, a destination address field. The efficiency with which header fields can be extracted, such as the destination address field of a network packet, may be a significant factor in the performance of a network and packet-based applications.

Generally, packet processing solutions use either a specific hardware solution for a specific networking protocol, or standard processor based solutions with the protocol processing written in software. The specific hardware solutions are used for processing speed, but lack flexibility. They typically support a specific protocol or protocols, can be difficult to extend, and can require a longer development time.

Standard processor solutions can provide substantial flexibility by allowing changes to the protocol supported by the changing of the software program. There are, however, drawbacks to standard processor solutions. Packet processing in a microprocessor is typically implemented with a succession of mask and shift instructions to extract protocol fields from the received data.

To be used by standard processor solutions, the packet data must be made available to the arithmetic logic unit (ALU) portion of the processor. A standard processor typically has to perform an uncached read to load packet data. For example, the ALU executes a MOV instruction (uncached read cycle) to read the packet data from memory to the processor register space. Once the data is in the processor register space, the data may then be manipulated at the processor instruction cycle rate. The MOV instruction, however, may be a significant bottleneck, which can significantly diminish performance, particularly with modern highly pipelined processors where it can cause a stall of the pipelined data.

SUMMARY OF THE DISCLOSURE

A microcode engine for processing packet data, according to certain embodiments disclosed herein, includes a program memory, a plurality of execution hardware blocks, instruction decode circuitry, a data stream receiver, and execution control circuitry. The program memory includes a plurality of instructions for processing a stream of received packet data. Each instruction includes a plurality of instruction fields. The plurality of execution hardware blocks are responsive to the instructions to perform respective functions on the received packet data. Each of the plurality of hardware blocks corresponding to a respective instruction field. The instruction decode circuitry reads a current instruction from the program memory and provides instruction fields of the current instruction to the corresponding execution hardware blocks for execution. The data stream receiver may directly receive a stream of data packets for processing. The data stream receiver provides the received packet data to the execution hardware blocks, synchronously with the provision of the instruction fields, based on an instruction of the plurality of instructions. The execution control circuitry directs reads from the data stream receiver for applying one or more of the instructions stored in the program memory to a current data word of the received packet data.

BRIEF DESCRIPTION OF THE DRAWINGS

Additional aspects and advantages will be apparent from the following detailed description, which proceeds with reference to the accompanying drawings.

DETAILED DESCRIPTION

Figure 1:
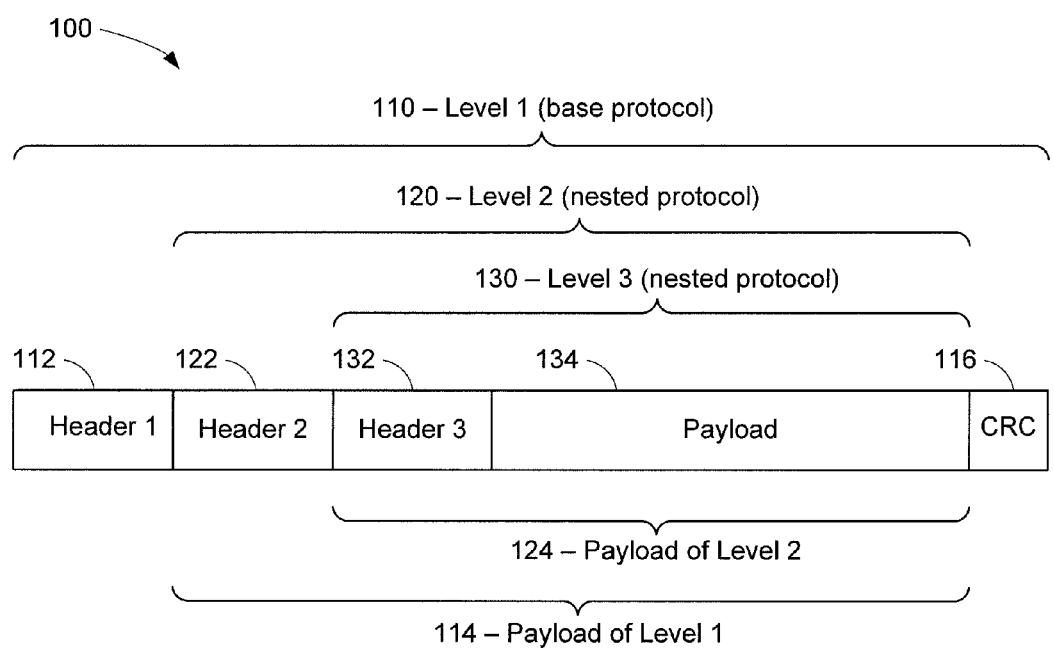
FIG. 1 illustrates an example of a data packet having multiple levels of networking protocols, which may be processed by embodiments of the present disclosure.

The present disclosure is directed to apparatus and methods to process packet data with substantially the efficiency and speed achieved with hardware solutions and having the programmability and flexibility provided by standard processor solutions. In one embodiment, a microcode engine designed to efficiently parse packet data may use instructions that are tailored to parse packet data fields of a packet having nested protocols. The microcode engine may enable highly efficient packet processing while preserving flexibility as to the protocols that can be processed. The implementation can be both specific to a task while allowing reprogramming to perform a different specific task simply by changing the program instructions. The packet data may be directly loaded into the processor space, for example into a special register, with zero latency. Thus, the data move from uncached memory space to the processor register space may be eliminated.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order. Skilled persons will recognize from the disclosure herein that many variations may be made to, for example, speeds, program store memory, instruction sets, instructions lengths, data stream width, and other parameters.

Figure 2:
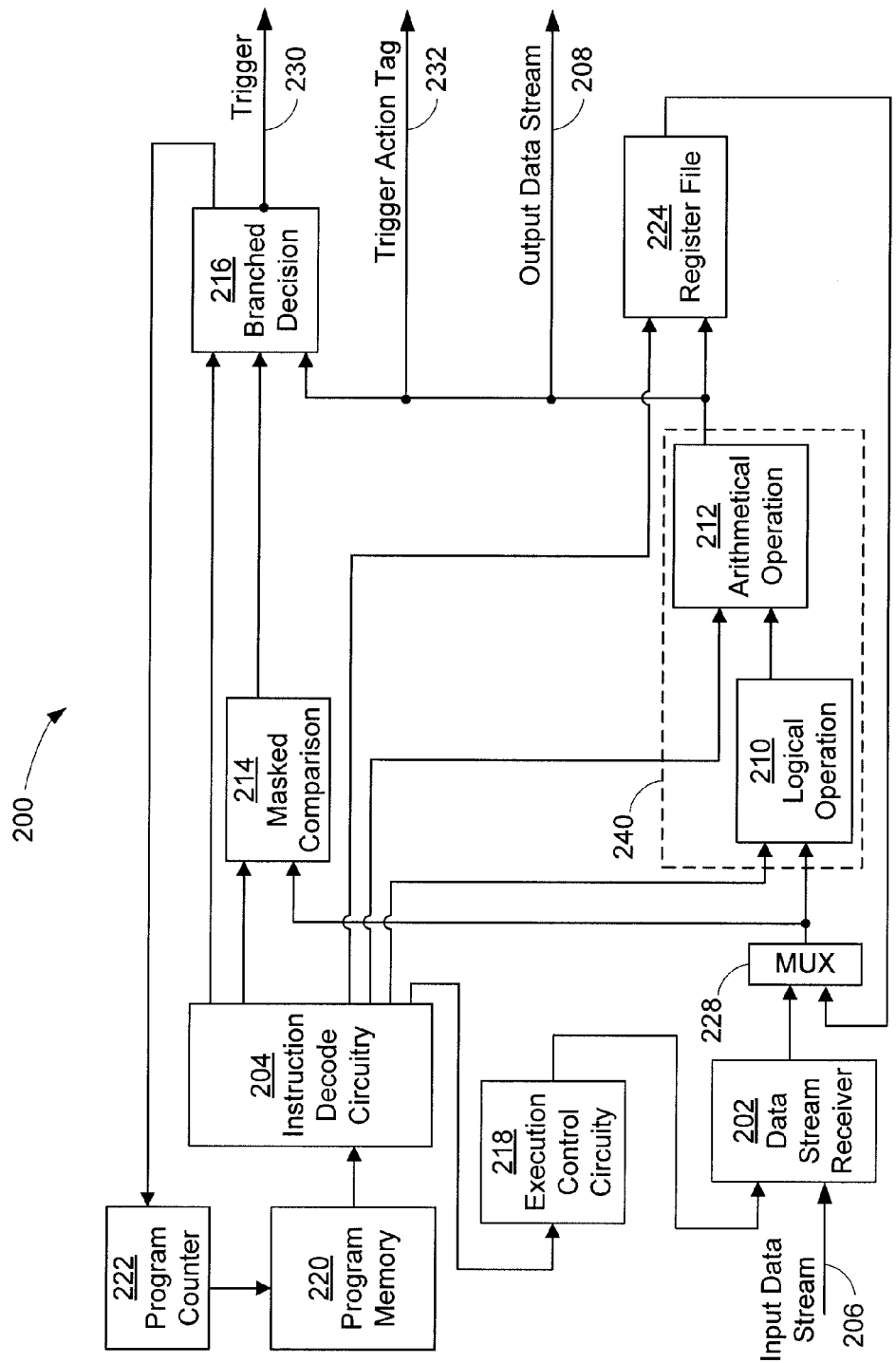
FIG. 2 is a block diagram of a microcode engine, according to one embodiment of the present disclosure.

FIG. 2 is a block diagram of a microcode engine 200, according to one embodiment of the present disclosure. The microcode engine 200 may include a data stream receiver 202, instruction decode circuitry 204, a plurality of execution hardware blocks 210, 212, 214, 216, execution control circuitry 218, a program memory 220, a program counter 222, and a register file 224. The microcode engine 200 is configured to process received packet data of an input data stream 206 and to provide an output data stream 208. The output data stream 208 may be either a modified or an unmodified version of the input data stream 206. The microcode engine 200 may be programmed to perform a specific task, and may be re-programmed by changing the program instructions.

As discussed below, the microcode engine 200 may be configured to efficiently parse packet data with instructions that are specially tailored for parsing protocol fields. The microcode engine 200 may operate in lock step with the received packet data of the input data stream 206 that is being analyzed, read instructions from the program memory 220, and execute the instructions using the execution hardware blocks 210, 212, 214, 216. In some embodiments, the function of each of the execution hardware blocks 210, 212, 214, 216 is performed in a single clock cycle. In other embodiments, an instruction may issue every cycle, but one or more pipeline stages may be used to complete a single instruction in a plurality of cycles. The microcode engine 200 does not have to load packet data into the register prior to performing field manipulation. Advancing the program counter 222 or taking a branch may be in lock step with reading a next received data word. A skilled person will recognize from the disclosure herein that the data word can be any width based on the particular design of the data paths, and that the width of the data paths can be increased for higher rate interfaces with nominal gate count increase. Further, a skilled person will recognize from the disclosure herein that the instructions stored in the program memory 220 may be any width. In one embodiment, for example, a 96 bit instruction is used. Any other width may also be used for the instruction, depending on the particular application. In an example embodiment, and not by way of limitation, the instruction word is a Very Long Instruction Word (VLIW) that allows packet data manipulation, masked comparison operation, and branch decision to be implemented in a single instruction.

The data stream receiver 202 and instruction decode circuitry 204 may operate synchronously to provide a data word of received packet data and current instruction fields to the execution hardware blocks 210, 212, 214, 216. As used herein, the term "synchronously" is a broad term that includes its ordinary and customary meaning and is broad enough to include, for example, making both a particular instruction and a corresponding data word available to the execution hardware blocks 210, 212, 214, 216 for execution. In other words, the microcode engine 200 operates in lock step with the input data stream 206.

The program memory 220 may include a plurality of instructions to process the received packet data. The instruction decode circuitry 204 reads a current instruction from the program memory 220 and provides appropriate instruction fields to the respective execution hardware blocks 210, 212, 214, 216. The instruction decode circuitry 204 selects the current instruction based on the program counter 222 and/or a branch decision. The program counter's value may be referred to herein as a program count (PC).

The execution hardware blocks 210, 212, 214, 216 may each include circuitry to perform discrete, unique functions with the received packet data. In the illustrated embodiment, a logical operation execution hardware block 210 and a arithmetical operation execution hardware block 212 may be consider as part of a data manipulation execution hardware block 240. The logical operation execution hardware block 210 includes logical operation circuitry to perform bitwise operations on the received packet data. Examples of such bitwise operations may include, but are not limited to, NOP, AND, OR, and XOR. There may be options for the logical operation execution hardware block 210 to select whether a constant is received from the instruction word, a register value, or a previous arithmetic result. For example, a multiplexer (MUX) 228 may allow the logical operation execution hardware block 210 to receive a constant from the register file 224 as input. The logical operation execution hardware block 210 may also be enabled to select received packet data, data from a log memory (not shown), or data from a parameter memory (not shown). The parameter memory may include, for example, a random access memory for state information.

The arithmetical operation execution hardware block 212 may include arithmetical operation circuitry to perform arithmetical operations on the received packet data. Examples of such arithmetic operations may include, but are not limited to, NOP, ADD, ADDC (add with carry), SUB, SUBB (subtract with borrow), logical left shift (multiply by $2^x$, wherein x is a constant), and logical right shift (divide by $2^x$, wherein x is a constant). The ADDC and SUBB operations may allow for addition and subtraction for received packet data that spans multiple received data words.

In the illustrated embodiment, the logical operation execution hardware block 210 and the arithmetic operation execution hardware block 212 of the data manipulation execution hardware block 240 are cascaded, such that the logical operation execution hardware block 210 result is provided as an input to the arithmetic operation execution hardware block 212. Thus, the arithmetic operation circuitry receives the current data word of received packet data after it has been processed by the logical operation circuitry. In a cascaded arrangement, these two execution hardware blocks 210, 212 can be used to perform mask and shift operations with constants to extract desired fields from the received packet data. Although cascaded, these two execution hardware blocks 210, 212 may still perform their functions with the received packet data in a single clock cycle, according to certain embodiments. These two cascaded execution hardware blocks 210, 212 apply instruction fields from the same instruction so as to perform two functions on the same data word that would otherwise be performed using two instructions.

The data manipulation execution hardware block 240 may include data manipulation circuitry to manipulate received packet data to, for example, extract desired fields from the received packet data. The data manipulation circuitry may parse data from received packet data corresponding to a data packet having a plurality of nested protocols to thereby extract a desired data field of the nested packet protocols of the received data packet. The data manipulation execution hardware block 240 may also be used in some embodiments to modify data. For example, a corresponding instruction field may include one or more bits that instruct the data manipulation execution hardware block 240 to delete (e.g., set to zero) specific data and/or replace specific data in the current data word with data stored in the register file 224 or another storage location.

A comparison execution hardware block 214 may include comparison circuitry to perform masked comparison operation(s) with the received packet data. A masked comparison operation may, for example, apply a mask to received packet data for comparison to an operand in the current instruction. Examples of comparison operations may include, but are not limited to, equals, not equals, equals or less than (or greater than) and equals or greater than (or less than). In one embodiment, the result of the comparison execution hardware block 214 may be applied over multiple clock cycles (e.g., applied to multiple data words of received packet data) with no extra overhead. There may also be options for the comparison execution hardware block 214 to select whether the comparand is a constant from the current instruction provided by the instruction decode circuitry 204, a register value, a value from the log memory, or a value from the parameter memory.

A branched decision execution hardware block 216 may include branched decision circuitry to determine when to branch from a sequential reading of instructions from the program memory. The branched decision circuitry may determine when to branch based at least in part on processed data received from at least one of the comparison circuitry and the data manipulation circuitry. Examples of branch operations may include, but are not limited to, NOP (i.e. no branch), BR (branch), BR.MTCH (branch on compare match), BR.N-MTCH (branch on compare no match), BR.Z (branch on the arithmetic block result equal to zero) and BR.NZ (branch on the arithmetic block result not equal to zero). If the branch result is true, then the program counter 222 may be loaded with an absolute branch address from the instruction. The branched decision execution hardware block 216 may also set a trigger 230 to generate external actions. A trigger action tag 232 may be constructed using a part of the instruction and, for example, the result of the arithmetical execution hardware block 212. The trigger action tag 232 may designate the external action to be performed.

As can be appreciated, other types of execution hardware blocks are possible and the scope of the invention is not limited by the examples provided herein. In applications besides computer networking, other operations with received packet data may be useful, and are contemplated by the present disclosure. Moreover, other combinations of the disclosed circuitry are possible within an execution hardware block and are contemplated by the present disclosure.

The execution control circuitry 218 may be configured to direct reads of data words from the data stream receiver 202 and thereby facilitate control over the instructions applied to particular data words. The execution control circuitry 218, by controlling when reads of the data stream receiver 202 take place, allows a plurality of instructions to be applied to the same data word. The execution control circuitry 218 may stall reading from the data stream receiver 202, for example, the current instruction and a next instruction (either at address PC+1 or PC=BranchAddr, wherein BranchAddr is the absolute address of the next instruction if a branch instruction determines a branch should be taken) is applied to the same data word. Stalling a read from the data stream receiver 202 may be accomplished a variety of ways. In one embodiment, a stall may include the data stream receiver 202 providing the same data word of received packet data as previously provided. In another embodiment, the execution control circuitry 218 may stall reading from the data stream receiver 202 by preventing the execution hardware blocks 210, 212, 214, 216 from performing a read.

The execution control circuitry 218 may also facilitate synchronous operation of the data stream receiver 202 and the instruction decode circuitry 204. The execution control circuitry 218 may receive an instruction field of the current instruction (e.g., from the instruction decode circuitry 204), and the execution control circuitry 218 may determine when to stall reads from the data stream receiver 202 based at least in part on the received instruction field.

In another embodiment, the execution control circuitry 218 may also direct synchronous operation of the of the execution hardware blocks 210, 212, 214, 216 and/or the register file 224. Accordingly, the execution control circuitry 218 may be connected to one or more of the execution hardware blocks 210, 212, 214, 216 and/or the register file 224.

The register file 224 may include circuitry for selectively storing processed, modified packet data, or unmodified packet data output by one or more of the execution hardware blocks 210, 212, 214, 216. In the illustrated embodiment, the register file circuitry is configured to selectively store data output by the arithmetical operation execution hardware block 212. In other embodiments, the register file 224 may be configured to store modified packet data output by other execution hardware blocks.

The output data stream 208 may serve a variety of functions, including but not limited to indicating information about the received packet data, input to or use in an application (e.g., display as video, play as audio), and further processing the received packet data (e.g., routing the received packet data to an intended destination address). In one embodiment, the output data stream 208 may be used in development, design, test, evaluation, and/or debug of a data stream processing device and/or a network. The embodiments of the present disclosure may be incorporated into network devices for data stream analysis. Examples of applications for data stream analysis using embedded design logic are disclosed in U.S. patent application Ser. No. 11/853,990, which is assigned to the assignee of the present application, and which is hereby incorporated by reference herein in its entirety. The microcode engine 200 allows such data stream analysis tools to be quickly and easily reconfigured for a different set of networking protocols above the transport layer. This may be useful with the rapid proliferation of software protocols being developed.

The microcode engine 200 may be used in a variety of applications. Some examples include, but are not limited to, packet parsing, packet data rewrite, and flow classification. Packet parsing may include decoding data packets and extracting information used for networking switch and/or router forwarding decisions. Packet data rewrite may include, for example, forwarding routed packets over layer 2 networks and/or tunneling packets over layer 2 and layer 3 networks by changing or pre-pending layer 2 header information. Flow classification may include, for example, computing a key from packet headers to identify packet flow. Key may be subsequently used, for example, in a search tree or an external content addressable memory (CAM) to uniquely identify flow.

The microcode engine 200 provides a new performance/flexibility in networking equipment designs. It may be faster than many microprocessor based solutions and more flexible than many fixed solutions. By being precisely targeted to a particular task, the microcode engine 200 provides a high performance solution with a reasonably small gate count. This allows certain embodiments to be embedded within a target design to add support features.

The microcode engine 200 is software programmable without re-programming, for example, a field-programmable gate array (FPGA) or complex programmable logic device (CPLD). This makes it able to adjust, for example, to a new input parameter for a particular debug trial run. Thus, the microcode engine 200 can be changed for each trial run and/or control parameters may be changed during a debug session. This interactive level of tool may allow an engineer, for example, to accomplish two or three times as much per debug session.

The microcode engine 200 is also productive, for example, in developing support for new protocols. Support for a new protocol may be implemented in a matter of days, instead of weeks or months. This fast development productivity allows the microcode engine 200 to be appropriate for protocols that have, for example, a small customer base or that are proprietary.

In certain embodiments, the same logic that is used to process the packet can be used to implement debug features. For example, at the same time that the packet is processed, specific conditions in the packet can also be monitored. In addition, useful debug tools that are not protocol specific can be implemented, such as scanning for a particular byte anywhere in a payload.

The microcode engine 200 also allows a user to focus on a particular layer of the protocol stack without having to track what is happening at other layers. For example, this may allow software developers to work without necessarily having a deep knowledge of the lower levels of the protocol stack that are implemented in hardware. In certain embodiments, the microcode engine 200 may be used as flow data logic for analyzing and/or processing data flowing across a plurality of data packets.

Figure 3:
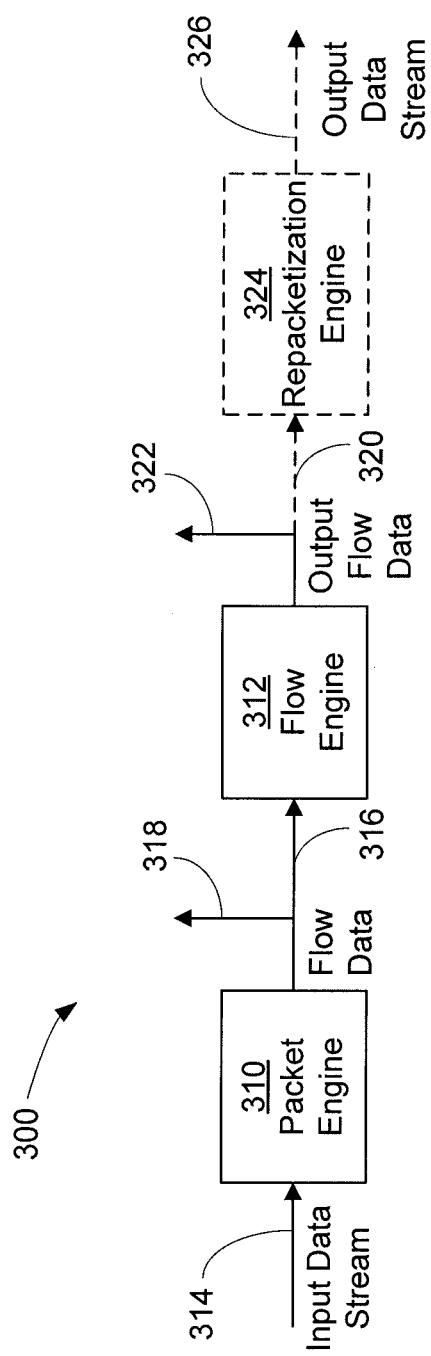
FIG. 3, is a block diagram of a cascaded microcode engines, according to one embodiment of the present disclosure.

For example, FIG. 3 is a block diagram of a system 300 of cascaded microcode engines 310, 312, according to one embodiment of the present disclosure. The illustrated embodiment provides for data flow analysis. Skilled persons will recognize from the disclosure herein, however, that the microcode engines disclosed herein may be cascaded so as to perform many other functions. In this embodiment, each microcode engine 310, 312 comprises the microcode engine 200 discussed above with respect to FIG. 2. Both microcode engines 310, 312 may have the same instruction set. However, the microcode instructions may be programmed differently.

In this example embodiment, the microcode engine 310 includes program instructions that cause it to function as a packet engine that receives an input data stream 314 corresponding to packet data, depacketizes the packet data, and outputs flow data 316 that may include information that spanned a plurality of data packets. The flow data 316 may include, for example, TCP payload data. Depending on the particular application, the microcode engine 310 may or may not modify the flow data 316 before providing it to the microcode engine 312. The microcode engine 310 may also provide the flow data 316 to other devices (not shown) for storage or further processing, as indicated by arrow 318. The microcode engine 312 includes program instructions that cause it to function as a flow engine that receives the flow data 316 and processes the received flow data 316 without regard for lower layer protocols corresponding to the packet level. The microprocessor 312 provides output flow data 320 that may or may not be modified, depending on the particular embodiment. The microcode engine 312 may provide the output flow data 320 to other devices (not shown) for storage or further processing, as indicated by arrow 322.

In addition, or in other embodiments, the system 300 may include other cascaded microcode engines that perform respective functions. For example, FIG. 3 illustrates an optional microcode engine 324 that includes program instructions that cause it to function as a repacketization engine that receives the output flow data 320 and applies the lower layer protocols corresponding to the packet level. The microcode engine 324 may provide an output data stream 326 corresponding to packet data. Depending on the particular application, the microcode engine may or may not modify the received output flow data 320 before providing it as the output data stream 326.

Figure 4:
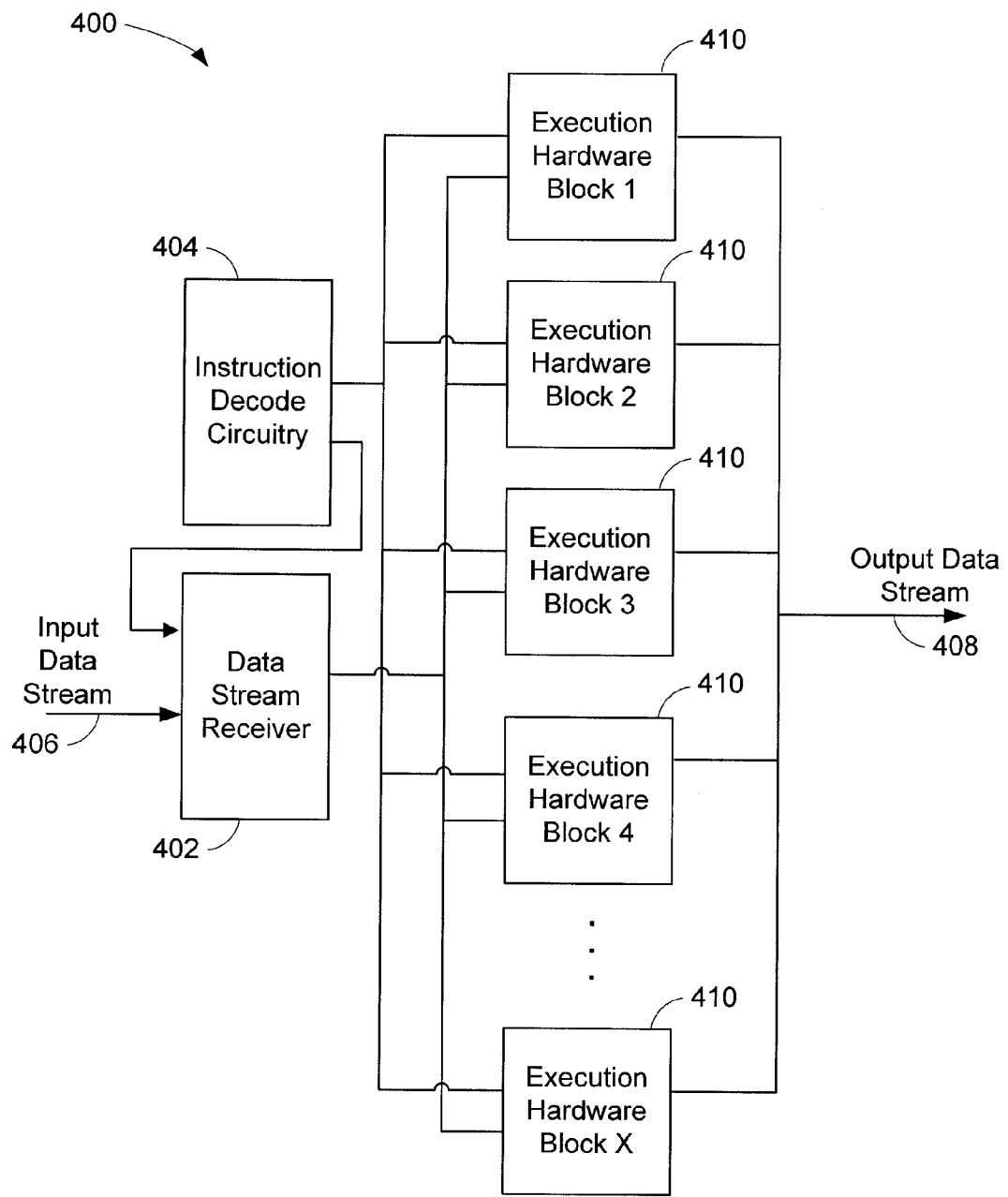
FIG. 4 is a simplified block diagram of a portion of a microcode engine, according to another embodiment of the present disclosure.

FIG. 4 is a simplified block diagram of a portion of a microcode engine, according to another embodiment of the present disclosure. The microcode engine 400 may include a data stream receiver 402, instruction decode circuitry 404, and a plurality of execution hardware blocks 410, as discussed above with respect to FIG. 2. The microcode engine 400 may be configured to process received packet data of an input data stream 406 of data packets and provide an output data stream 408 that may or may not be modified, depending on the particular application. The input data stream 406 of data packets may include packets having a plurality of nested packet protocols.

The input data stream 406 may be a stream of packets in a communications network, for example. An example of a communications network may be a computer network such as the Internet. The output data stream 408 may be parsed or otherwise extracted from one or more data packets from the input data stream 406. The output data stream 408 may be extracted from any level of nested protocol. For example, a field may be parsed from the header of one of the nested protocols to determine how a packet should be routed in a communications network.

The data stream receiver 402 may provide a data word to the execution hardware blocks 410 by, for example, loading the data word into a special purpose register or other memory device that is directly accessible by the execution hardware blocks 410. The data stream receiver 402 may include, for example, as a first in, first out (FIFO) device that may be implemented with static random access memory (SRAM) or other suitable memory technology.

The various components of the microcode engine 400 may be connected by a plurality of electrical connections and/or data paths. The width of the data path(s) by which the data stream receiver 402 provides a data word to the execution hardware blocks 410 may vary according to the implementation. The instruction decode circuitry 404 provides instructions to the execution hardware blocks 410. The instructions may include a plurality of instruction fields that direct corresponding execution hardware blocks 410 to perform functions with received packet data. The instruction decode circuitry 404 may obtain a current instruction and then synchronously provide the plurality of instruction fields of the current instruction to the corresponding execution hardware blocks 410. The plurality of instruction fields of the instruction are provided synchronously with the provision of a data word such that the appropriate instruction and data word are both made available for processing. An instruction field of each instruction may also be provided to the data stream receiver 402 to facilitate synchronous operation of the data stream receiver 402 and the instruction decode circuitry 404.

The plurality of execution hardware blocks 410 may each include one or more logic gates and/or other electrical circuit components and may each be configured to perform a respective function with received packet data. As previously described, the data stream receiver 402 and the instruction decode circuitry 404 may synchronously provide the current instruction fields and a data word of received packet data to the execution hardware blocks 410. Each execution hardware block 410 may correspond to a current instruction field, such that each execution hardware block 410 performs a function with received packet data based on the corresponding current instruction field. FIG. 4 portrays the execution hardware blocks 410 in a parallel arrangement to illustrate that in one embodiment, all of the execution hardware blocks 410 perform their respective functions in the same (single) clock cycle. Although portrayed in parallel, the execution hardware blocks 410 may be cascaded (as discussed above with respect to FIG. 2), such that a first execution hardware block 410 provides an input to a second execution hardware block 410. Where execution hardware blocks are cascaded, the functions may still be performed in the same (single) clock cycle.

Figure 5:
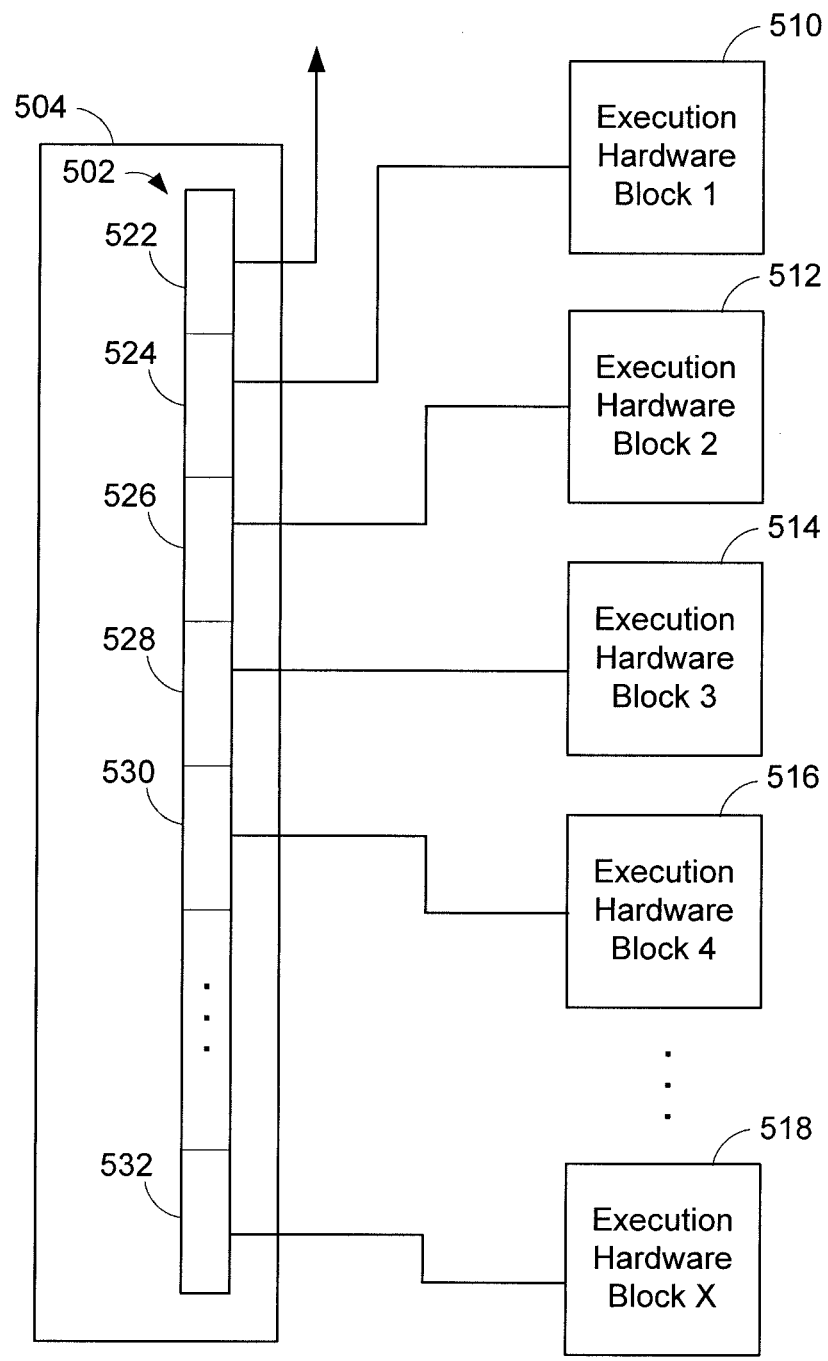
FIG. 5 is simplified block diagram illustrating an embodiment of an instruction including a plurality of instruction fields that each direct a corresponding execution hardware block, according to one embodiment of the present disclosure.

FIG. 5 is a simplified block diagram illustrating an embodiment of an instruction 502 provided by instruction decode circuitry 504. The instruction 502 includes a plurality of instruction fields 522, 524, 526, 528, 530, 532. In the illustrated embodiment, a first instruction field 522 may direct another component (not shown) of the microcode engine, such as a data stream receiver or execution control circuitry, and the other instruction fields 524, 526, 528, 530, 532 each correspond to and direct a respective execution hardware block 510, 512, 514, 516, 518. For example, a second instruction field 524 may direct the execution hardware block 510 to perform a function. The function performed may be discrete and/or unique relative to functions performed by other execution hardware blocks 512, 514, 515, 518. As previously explained, the execution hardware blocks 510, 512, 514, 516, 518 may perform their respective functions in a single clock cycle. The execution hardware blocks 510, 512, 514, 516, 518 may also be pipelined such that a plurality of clock cycles are used to complete an instruction. In the illustrated embodiment, each execution hardware block 510, 512, 514, 516, 518 may receive only the relevant corresponding instruction field 524, 526, 528, 530, 532 from the instruction decode circuitry 504 (e.g., the execution hardware block 510 receives the instruction field 524, the execution hardware block 512 receives the instruction field 526, etc., as depicted). In another embodiment, the execution hardware blocks 510, 512, 514, 516, 518 may receive the entire instruction 502 and extract the relevant corresponding instruction field 524, 526, 528, 530, 532.

Figure 6:
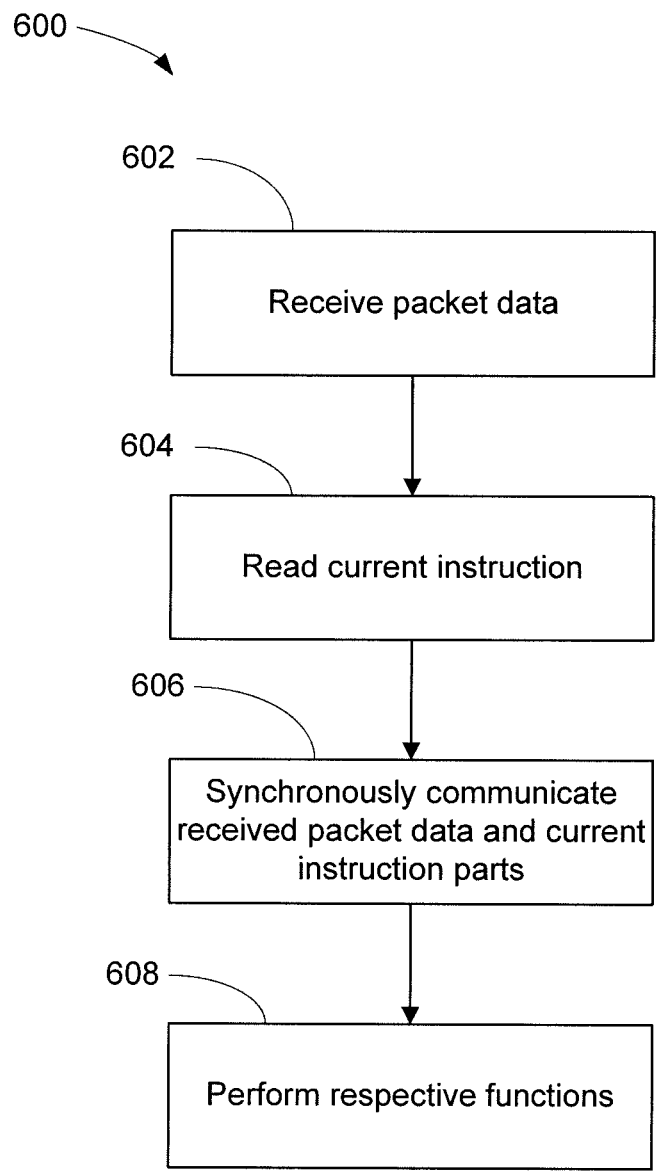
FIG. 6 is a flow diagram of a method for processing data packets, according to one embodiment of the present disclosure.

FIG. 6 is a flow diagram of a method 600 for processing data packets, according to one embodiment of the present disclosure. Packet data is received 602 from a stream of data packets. A data stream receiver may receive 602 the packet data. A current instruction for processing the packet data may be read 604 from a program memory. Instruction decode circuitry may read the instruction from the program memory. The method 600 then synchronously communicates 606, to a plurality of execution hardware blocks, both data word of the received packet data and instruction fields of the current instruction. The instruction fields may direct the plurality of execution hardware blocks to perform 608 their respective functions on the data word of received packet data. The performance 608 of the functions may produce modified or unmodified packet data that indicates information about the data packet. The modified or unmodified packet data may be further used, for example to further process the data packet.

Figure 7:
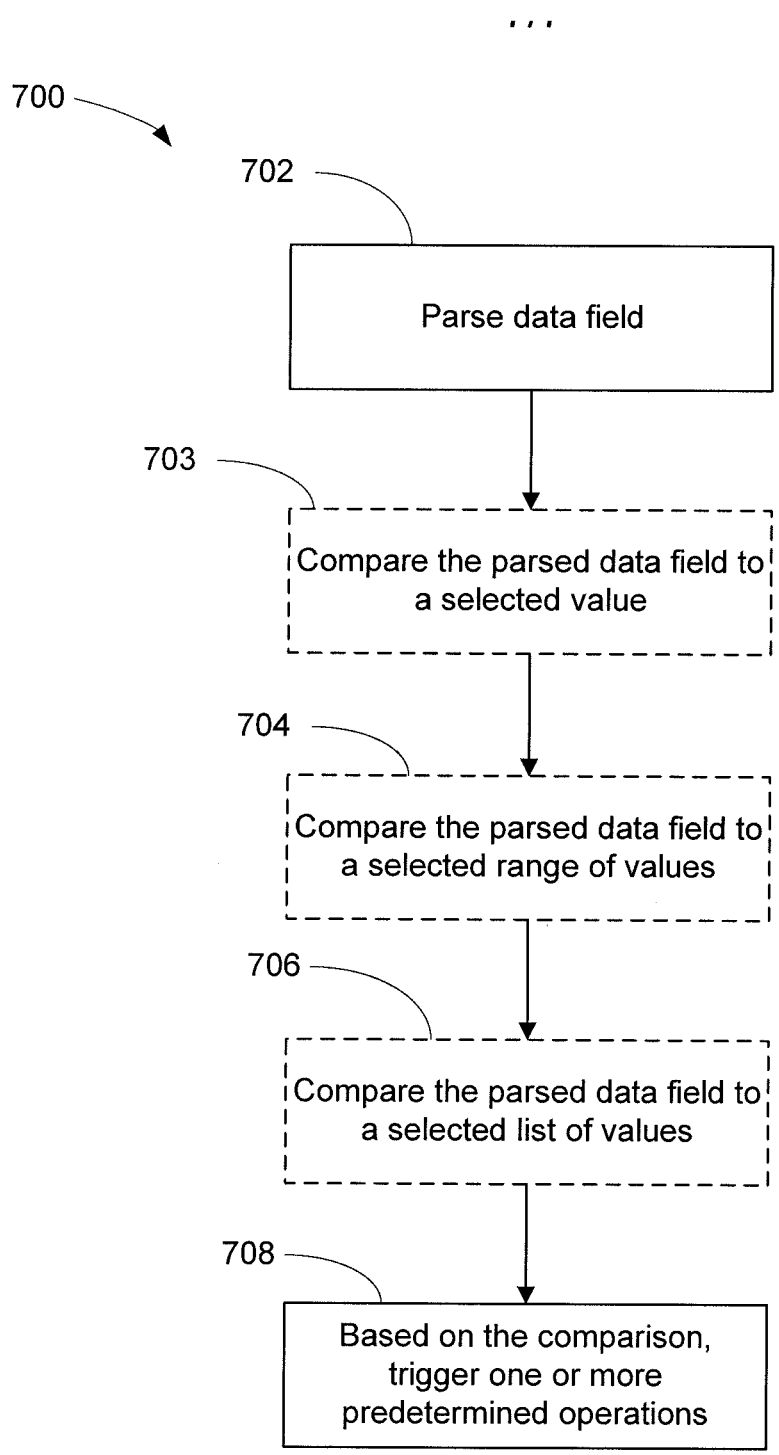
FIG. 7 is a flow diagram of a method for processing data packets, according to another embodiment of the present disclosure.

FIG. 7 is a flow diagram of a method 700 for processing data packets, according to another embodiment of the present disclosure. The method 700 may be performed, for example, by masked comparison circuitry of microcode engine embodiments discussed herein. The method 700 includes parsing 702 a data field in a current data word. In one embodiment, the method includes comparing 703 the parsed data field to a selected value and, based on the comparison, triggering 708 one or more predetermined operations. The comparison may include an operation such as equals, not equals, equals or less than, equals or greater than, or other comparison operations. In another embodiment, the method 700 includes comparing 704 the parsed data field to a selected range of values and, based on the comparison, triggering 708 one or more predetermined operations. It may be useful to detect ranges of values for many different types of data fields within a data packet. Examples of such data fields include, but are not limited to, a network address field, a port number field, a packet length field, a type of service field, a protocol field, and any other type data field that can be within a range of values. In another embodiment, the method 700 includes comparing 706 the parsed data field to a selected list of values and, based on the comparison, triggering 708 one or more predetermined operations. In certain such embodiments, CAMs are used to store the selected lists of values. In addition, or in other such embodiments, the selected list of values are not in a sequential list of values. For each of these embodiments, the triggered operation may include, but is not limited to, starting a timer, incrementing a counter, logging an event, modifying packet data, or any other type of operation.

It will be understood by those having skill in the art that many changes may be made to the details of the above-described embodiments without departing from the underlying principles of the invention. The scope of the present invention should, therefore, be determined only by the following claims.

The invention claimed is:

1. A microcode engine for processing packet data, the microcode engine comprising:
   a program memory comprising a plurality of instructions for processing a stream of received packet data, wherein each instruction includes a plurality of instruction fields;
   a plurality of execution hardware blocks responsive to the instructions to perform respective functions on the received packet data, each of the plurality of hardware blocks corresponding to a respective instruction field, wherein the plurality of execution hardware blocks comprise:
      comparison circuitry to perform a masked comparison of the received packet data; and
      branched decision circuitry to determine when to branch from a sequential reading of instructions from the program memory;
   instruction decode circuitry to read a current instruction from the program memory, to provide instruction fields of the current instruction to the corresponding execution hardware blocks for execution, to read, based on an output of the branched decision circuitry, a next instruction from the program memory, and to provide instruction fields of the next instruction to the corresponding execution hardware blocks for execution;
   a data stream receiver to directly receive a stream of data packets for processing, the stream of data packets comprising the received packet data, the data stream receiver providing the received packet data to the execution hardware blocks, synchronously with the provision of the instruction fields, based on an instruction of the plurality of instructions; and
   execution control circuitry to direct reads from the data stream receiver for applying one or more of the instructions stored in the program memory to a current data word of the received packet data, and to stall reads from the data stream receiver so as to apply both the current instruction and the next instruction to the current data word.

2. The microcode engine of claim 1, wherein the plurality of execution hardware blocks comprise:
   logical operation circuitry to perform bit wise logical operations on the received packet data; and
   arithmetical operation circuitry to perform arithmetic operations on the received packet data.

3. The microcode engine of claim 2, wherein the logical operation circuitry and the arithmetical operation circuitry both apply the same current instruction to the current data word and are cascaded such that the arithmetical operation circuitry receives the current data word of the received packet data after it has been processed by the logical operation circuitry.

4. The microcode engine of claim 1, wherein the execution control circuitry is further configured to direct reads from the data stream receiver so as to apply one or more instructions stored in the program memory to a next data word.

5. The microcode engine of claim 1, wherein the functions of each of the plurality of execution hardware blocks are performed in a single clock cycle.

6. The microcode engine of claim 1, wherein the execution hardware blocks are pipelined such that the hardware execution blocks use a plurality of clock cycles to complete a single instruction.

7. The microcode engine of claim 1, wherein the plurality of execution hardware blocks comprise masked comparison circuitry responsive to corresponding instruction fields for:
   parsing a data field in the current data word;
   comparing the parsed data field to a selected range of values; and
   based on the comparison, triggering one or more predetermined operations.

8. The microcode engine of claim 7, wherein the parsed data field is selected from a group comprising a network address field, a port number field, a packet length field, a type of service field, and a protocol field.

9. The microcode engine of claim 1, wherein the plurality of execution hardware blocks comprise masked comparison circuitry responsive to corresponding instruction fields for:
   parsing a data field in the current data word;
   comparing the parsed data field to a selected list of values that are not in a sequential range of values; and
   based on the comparison, triggering one or more predetermined operations.

10. The microcode engine of claim 1, wherein the plurality of execution hardware blocks comprise data manipulation circuitry responsive to corresponding instruction fields for modifying the stream of data packets in real-time.

11. The microcode engine of claim 1, wherein the plurality of execution hardware blocks comprise data manipulation circuitry that parses, based on the corresponding instruction fields, data from a received data packet having a plurality of nested protocols to thereby extract a desired data field of the nested packet protocols of the received data packet.

12. The microcode engine of claim 1, further comprising flow data logic for analyzing data flowing across a plurality of data packets, the flow data logic comprising:
   a second microcode engine for processing a flow data stream provided by one of the plurality of execution hardware blocks, wherein the second microcode engine comprises:
      a second plurality of execution hardware blocks;
      second instruction decode circuitry to provide instruction fields of a second plurality of instructions to the corresponding second execution hardware blocks for execution;
      a second data stream receiver to directly receive the flow data for processing, the second data stream receiver providing the received flow data to the second execution hardware blocks, synchronously with the provision of the second instructions, based on an instruction of the second plurality of instructions; and
      second execution control circuitry to direct reads from the second data stream receiver for applying one or more of the second instructions to a current flow data word of the flow data stream.

13. The microcode engine of claim 12, further comprising repacketizing logic for repacketizing output flow data from the flow data logic, the repacketizing logic comprising:
   a third microcode engine, wherein the third microcode engine comprises:
      a third plurality of execution hardware blocks;
      third instruction decode circuitry to provide instruction fields of a third plurality of instructions to the corresponding third execution hardware blocks for execution;

a third data stream receiver to directly receive the output flow data from the flow data logic for processing, the third data stream receiver providing the received output flow data to the third execution hardware blocks, synchronously with the provision of the third instructions, based on an instruction of the third plurality of instructions; and third execution control circuitry to direct reads from the third data stream receiver for applying one or more of the third instructions to a current output flow data word to repacketize the output flow data stream.

14. A method for processing packet data on a network device having a plurality of execution hardware blocks, the method comprising:

receiving, directly via a data stream receiver, packet data;

reading a current instruction from a program memory, the current instruction having a plurality of instruction fields corresponding to the plurality of execution hardware blocks, the program memory having a plurality of instructions to process the received packet data;

synchronously communicating to the execution hardware blocks both a current data word of the received packet data and the corresponding instruction fields of the current instruction for execution by the respective execution hardware blocks;

performing respective functions of the execution hardware blocks on the current data word according to the corresponding instruction fields of the current instruction;

performing a masked comparison of the received packet data;

determining when to branch from a sequential reading of instructions from the program memory;

reading, based on the determination, a next instruction from the program memory;

providing instruction fields of the next instruction to the corresponding execution hardware blocks for execution; and stalling reads from the data stream receiver so as to apply both the current instruction and the next instruction to the current data word.

15. The method of claim 14, wherein performing the respective functions of the execution hardware blocks comprises:

performing bit wise logical operations on the received packet data; and performing arithmetic operations on the received packet data.

16. The method of claim 15, further comprising:

applying the same current instruction to the current data word during the bit wise logical operations and the arithmetic operations; and cascading the bit wise logical operations and the arithmetical operations.

17. The method of claim 14, further comprising directing reads from the data stream receiver so as to apply one or more instructions stored in the program memory to a next data word.

18. The method of claim 14, further comprising performing the functions of each of the plurality of execution hardware blocks in a single clock cycle.

19. The method of claim 14, pipelining the execution hardware blocks such that the hardware execution blocks use a plurality of clock cycles to complete a single instruction.

20. The method of claim 14, wherein performing the respective functions comprises:

parsing a data field in the current data word;

comparing the parsed data field to a selected range of values; and based on the comparison, triggering one or more predetermined operations.

21. The method of claim 20, further comprising selecting the parsed data field from a group comprising a network address field, a port number field, a packet length field, a type of service field, and a protocol field.

22. The method of claim 14, wherein performing the respective functions comprises:

parsing a data field in the current data word;

comparing the parsed data field to a selected list of values that are not in a sequential range of values; and based on the comparison, triggering one or more predetermined operations.

23. The method of claim 14, wherein performing the respective functions comprises modifying the packet data in real-time.

24. The method of claim 14, performing the respective functions comprises outputting data flowing across a plurality of data packets, the method further comprising using a first microcode engine to analyze the data flowing across the plurality of data packets.

25. The method of claim 24, further comprising using a second microcode engine to repacketize output flow data from the first microcode engine.

26. A microcode engine for processing data packets, the microcode engine comprising:

means for storing a plurality of instructions for processing a stream of received packet data, wherein each instruction includes a plurality of instruction fields;

a plurality of means for performing respective functions on the received packet data, each of the plurality of means for performing corresponding to a respective instruction field;

means for reading a current instruction from the means for storing and for providing instruction fields of the current instruction to the corresponding means for performing;

means for directly receiving a stream of data packets for processing, the stream of data packets comprising the received packet data, the means for directly receiving providing the received packet data to the means for performing, synchronously with the provision of the instructions, based on an instruction of the plurality of instructions;

means for execution control for directly reading from the means for directly receiving for applying one or more of the stored instructions to a current data word of the received packet data;

means for performing a masked comparison of the received packet data;

means for determining when to branch from a sequential reading of instructions from the means for storing a plurality of instructions;

means for reading, based on the determination, a next instruction from the means for storing a plurality of instructions;

means for providing instruction fields of the next instruction to the corresponding means for performing; and stalling reads from the means for reading so as to apply both the current instruction and the next instruction to the current data word.

* * * * *